(12) United States Patent
Boccuccia et al.

(10) Patent No.: US 10,464,456 B2
(45) Date of Patent: Nov. 5, 2019

(54) ACTIVE SEAT BOLSTER ADJUSTMENT BASED ON OCCUPANT PRESSURE MAP AND METHOD

(71) Applicant: Ford Global Technologies, LLC, Dearborn, MI (US)

(72) Inventors: Daniel Boccuccia, San Francisco, CA (US); Andres Senatore, Mountain View, CA (US); John Wayne Jaranson, Dearborn, MI (US); Alexander Alborzi Calderon, San Carlos, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 215 days.

(21) Appl. No.: 15/783,292

(22) Filed: Oct. 13, 2017

(65) Prior Publication Data

US 2019/0031138 A1 Jan. 31, 2019

Related U.S. Application Data

(63) Continuation of application No. 15/663,342, filed on Jul. 28, 2017.

(51) Int. Cl.
*B60N 2/62* (2006.01)
*B60N 2/00* (2006.01)
*B60N 2/64* (2006.01)
*B60N 2/02* (2006.01)

(52) U.S. Cl.
CPC ............... *B60N 2/62* (2013.01); *B60N 2/002* (2013.01); *B60N 2/646* (2013.01); *B60N 2002/0288* (2013.01)

(58) Field of Classification Search
CPC .. B60N 2002/0288; B60N 2/002; B60N 2/62; B60N 2/646
USPC ............................................ 297/284.9, 284.3
See application file for complete search history.

(56) References Cited

U.S. PATENT DOCUMENTS

| | | | |
|---|---|---|---|
| 4,924,162 A | 5/1990 | Sakamoto et al. | |
| 5,130,622 A | 7/1992 | Takizawa et al. | |
| 5,707,109 A | 1/1998 | Massara et al. | |
| 6,037,731 A | 3/2000 | Fruehauf et al. | |
| 6,122,568 A | 9/2000 | Madau et al. | |
| 6,629,715 B2 | 10/2003 | Oh et al. | |
| 7,125,077 B2 | 10/2006 | Frank | |
| 9,499,072 B2 * | 11/2016 | Yetukuri | B60N 2/0284 |
| 10,137,802 B2 * | 11/2018 | Cuddihy | B60N 2/914 |
| 2010/0117412 A1 * | 5/2010 | Bicker | B60N 2/809 |
| | | | 297/217.1 |

(Continued)

*Primary Examiner* — Milton Nelson, Jr.
(74) *Attorney, Agent, or Firm* — Vichit Chea; Price Heneveld LLP

(57) ABSTRACT

A method for adjusting an adjustable component in a seat assembly includes the steps of: (1) providing a seat assembly having an adjustable support plate and a sensor; (2) supporting a seat occupant on the seat assembly; (3) moving the support plate into contact with the seat occupant; (4) sensing a pressure value applied to the support plate using the sensor as the support plate contacts the seat occupant; and (5) retaining the support plate in a deployed position. The movement of the support plate is configured to cease when the pressure value is initially detected or when the pressure value exceeds a predetermined threshold.

14 Claims, 11 Drawing Sheets

(56) References Cited

U.S. PATENT DOCUMENTS

2014/0361590 A1* 12/2014 Line .................... B60N 2/0244
297/284.9

* cited by examiner

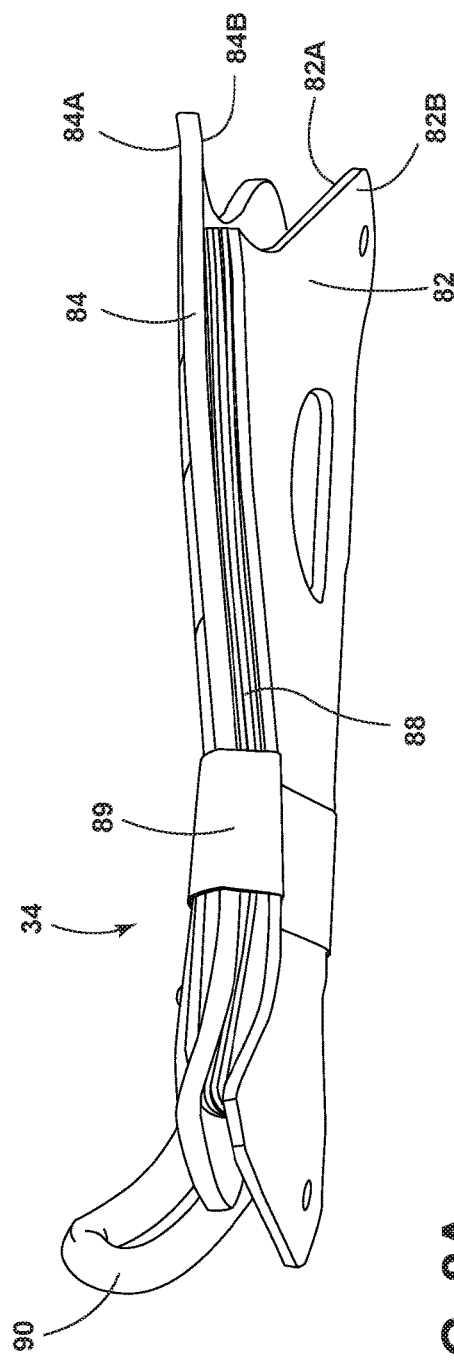
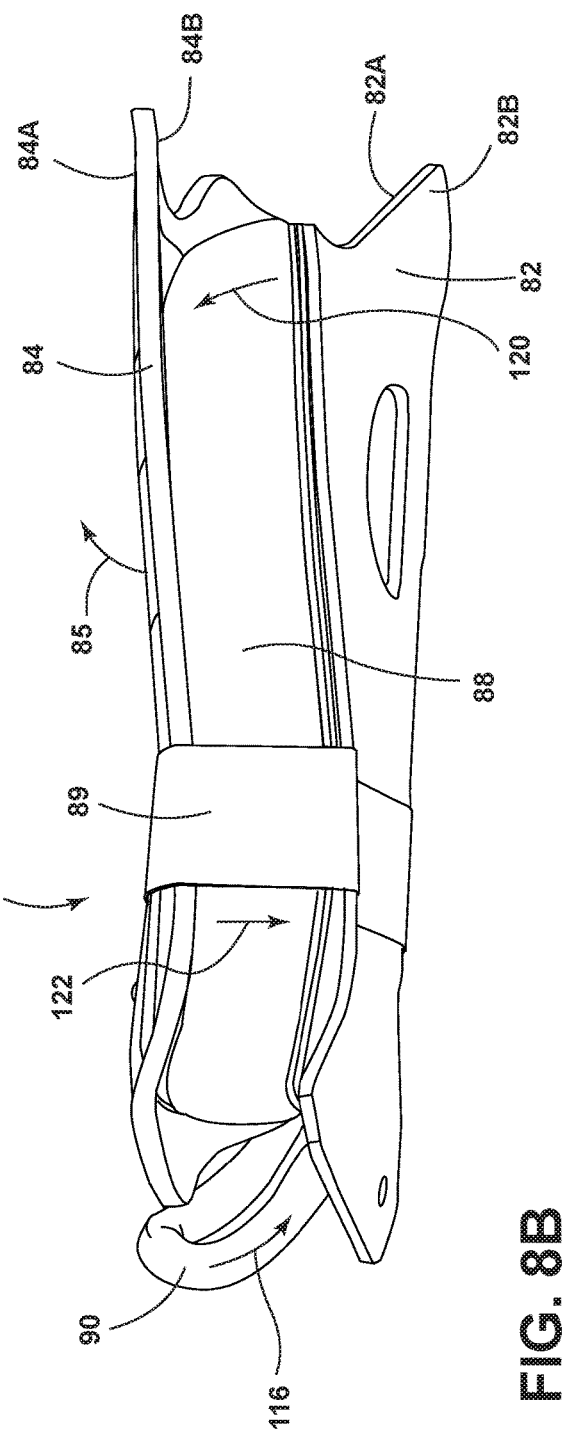
FIG. 8A
FIG. 8B

ACTIVE SEAT BOLSTER ADJUSTMENT BASED ON OCCUPANT PRESSURE MAP AND METHOD

CROSS-REFERENCE TO RELATED APPLICATIONS

This application is a continuation of U.S. patent application Ser. No. 15/663,342, filed on Jul. 28, 2017, entitled ACTIVE SEAT BOLSTER ADJUSTMENT BASED ON OCCUPANT PRESSURE MAP AND METHOD, the entire disclosure of which is hereby incorporated by reference.

FIELD OF THE INVENTION

The present invention generally relates to a vehicle seat assembly, and more particularly, to a vehicle seat assembly having adjustable components which are configured to adjust in response to an input from a sensor mechanism.

BACKGROUND OF THE INVENTION

Vehicle seat assemblies are presently featuring more adjustment features to provide a customized support configuration for an individual driver. Generally, a seat assembly is adjusted using inputs from a driver to adjust various components to a desired position, where the component remains until later adjusted by the vehicle occupant. During use, and particularly during use of high performance vehicles, a vehicle occupant may experience forces that cause a perception of weight. Such forces may include different types of acceleration, such as G-force. Particularly during a cornering condition, a vehicle occupant can move or lean in a particular direction due to a G-force acceleration. Vehicle occupants vary greatly in various parameters such as size and mass. Thus, lateral acceleration forces affect different vehicle occupants differently. Thus, it is desired to provide a vehicle seat assembly, wherein adjustable features are programmed to adjust in ways to help a vehicle occupant counter the effects of lateral acceleration experienced by bolstering support for the vehicle occupant as needed.

SUMMARY OF THE INVENTION

One aspect of the present invention includes a method for actively adjusting an adjustable component in a vehicle seat, including the steps of: (1) providing a seat assembly having a seat portion with first and second side bolsters disposed on opposite sides of the seat portion, first and second adjustable components and first and second sensors disposed in the first and second side bolsters, and a controller operably coupled to both the first and second adjustable components and the first and second sensors; (2) detecting a pressure value using one of the first and second sensors; (3) determining if the pressure value exceeds a threshold value; and moving an articulating support plate of the adjustable component associated with the sensor detecting the pressure value towards an extended position from a retracted position to a degree commensurate with pressure value detected.

Embodiments of the first aspect of the invention can include any one or a combination of the following features:
  Determining if the pressure value falls below the threshold value;
  Moving the articulating support plate towards the retracted position when the pressure value is below the threshold value;
  Inflating an air bladder with a pump controlled by the controller, wherein the air bladder is positioned to abut an undersurface of the articulating support plate to move the support plate towards the extended position when the air bladder is in an inflated condition;
  Deflating the air bladder to move the support plate towards the retracted position from the extended position; and
  An adjustment mechanism operably coupled to the controller and disposed between the baseplate and the articulating support plate to move the articulating support plate between the extended and retracted positions.

Another aspect of the present invention includes a method for actively adjusting an adjustable component, including the steps of: (1) providing a seat assembly having a seat portion with a side bolster, an adjustable component and an associated sensor disposed in the side bolster, and a controller operably coupled to the adjustable component and the sensor; (2) detecting a pressure value with the sensor; (3) rotating a support plate of the adjustable component towards an extended position from an at-rest position.

Yet another aspect of the present invention includes a method for actively adjusting an adjustable component, including the steps of: (1) providing a seat assembly having a seat portion with a side bolster, an adjustable component adjustable between extended and retracted positions and an associated sensor disposed in the side bolster, and a controller operably coupled to the adjustable component and the sensor; (2) detecting a pressure value with the sensor; and (3) rotating a portion of the associated adjustable component towards the extended position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8A is a side elevational view of an adjustable component in a retracted position FIG. 8B is a side elevational view of the adjustable component of FIG. 8A in an extended position;

DETAILED DESCRIPTION OF THE PREFERRED EMBODIMENTS

Figure 1:
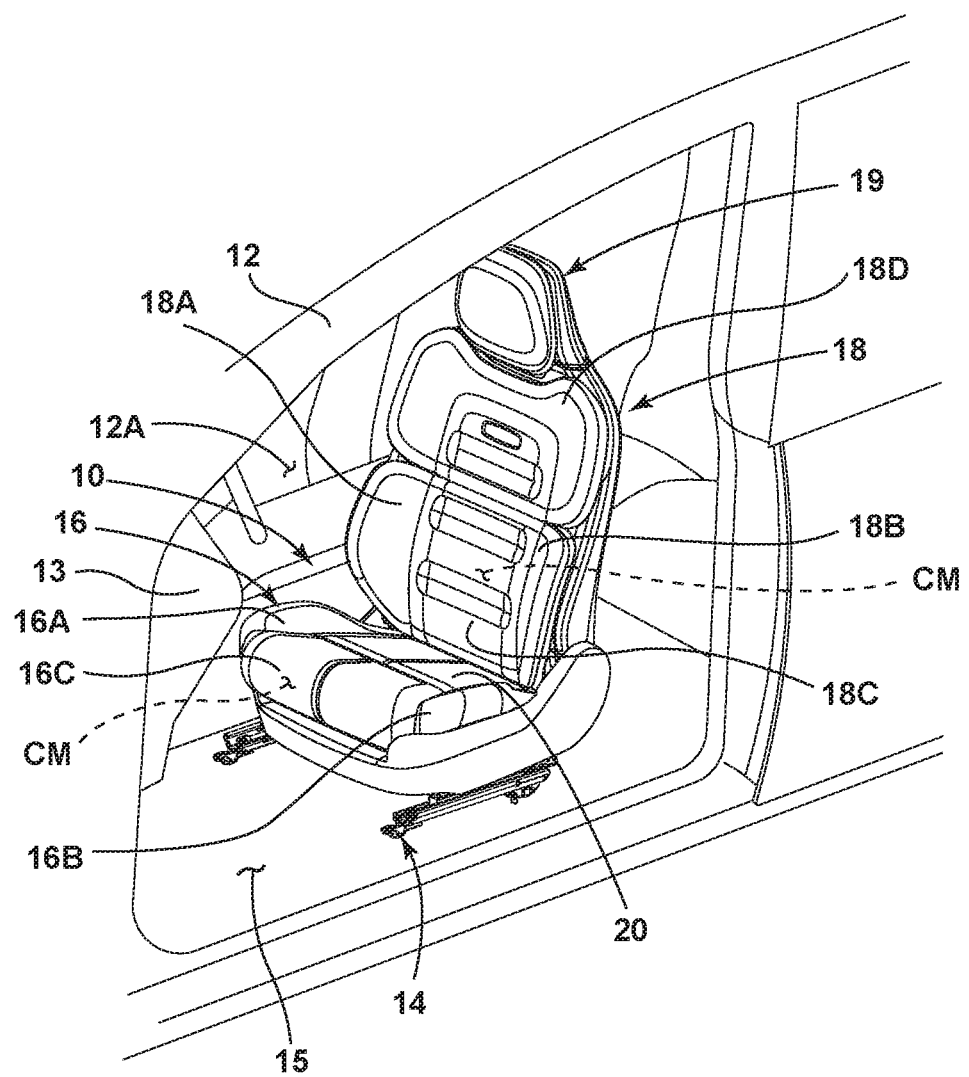
FIG. 1 is a top perspective view of a vehicle seat assembly according to one embodiment of the present invention shown positioned within a vehicle interior.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle seat 10 is shown disposed within an interior 12A of a vehicle 12. Specifically, the vehicle seat 10 is disposed in the vehicle interior 12A adjacent to an instrument panel or dashboard 13. In FIG. 1, the vehicle seat 10 is positioned on a driver's side seating area. However, it is contemplated that the vehicle seat 10, or various components and features thereof, can be disposed in other seat assemblies disposed in other areas of a vehicle interior, such as the passenger side seating area, a rear seating area, or a third row seating area. The vehicle seat 10 is supported on a track system 14 disposed on a vehicle floor support surface 15, and generally includes a substantially horizontal seat portion 16 and a substantially upright seatback 18. A headrest assembly 19 is disposed on an upper portion of the seatback 18. It is contemplated that the seatback 18 is a pivoting member configured for pivotal movement relative to the seat portion 16. The seat portion 16 generally includes a central support portion 16C having protruding fins or side bolsters 16A, 16B disposed on opposite sides thereof. The side bolsters 16A, 16B are separated or spaced-apart from one another by the central support portion 16C and are generally disposed at an inward angle directed towards the central support portion 16C. The side bolsters 16A, 16B are configured to provide support for a vehicle occupant as seated in the vehicle seat 10 when the vehicle 12 is in motion. Similarly, the seatback 18 includes side bolsters 18A, 18B and an upper collar portion 18D. The side bolsters 18A, 18B and the upper collar portion 18D are generally angled towards a central support portion 18C of the seatback 18.

The various parts of the seat portion 16 and seatback 18 are shown in FIG. 1 covered with an upholstered seat cover 20 that covers various cushion materials CM used to provide increased cushioned support for a vehicle occupant in both the seat portion 16 and the seatback 18. The seat cover 20 is contemplated to be comprised of a suitable natural or synthetic material, or any combination thereof, that is used to generally cover the cushion materials CM of the vehicle seat 10.

Figure 2:
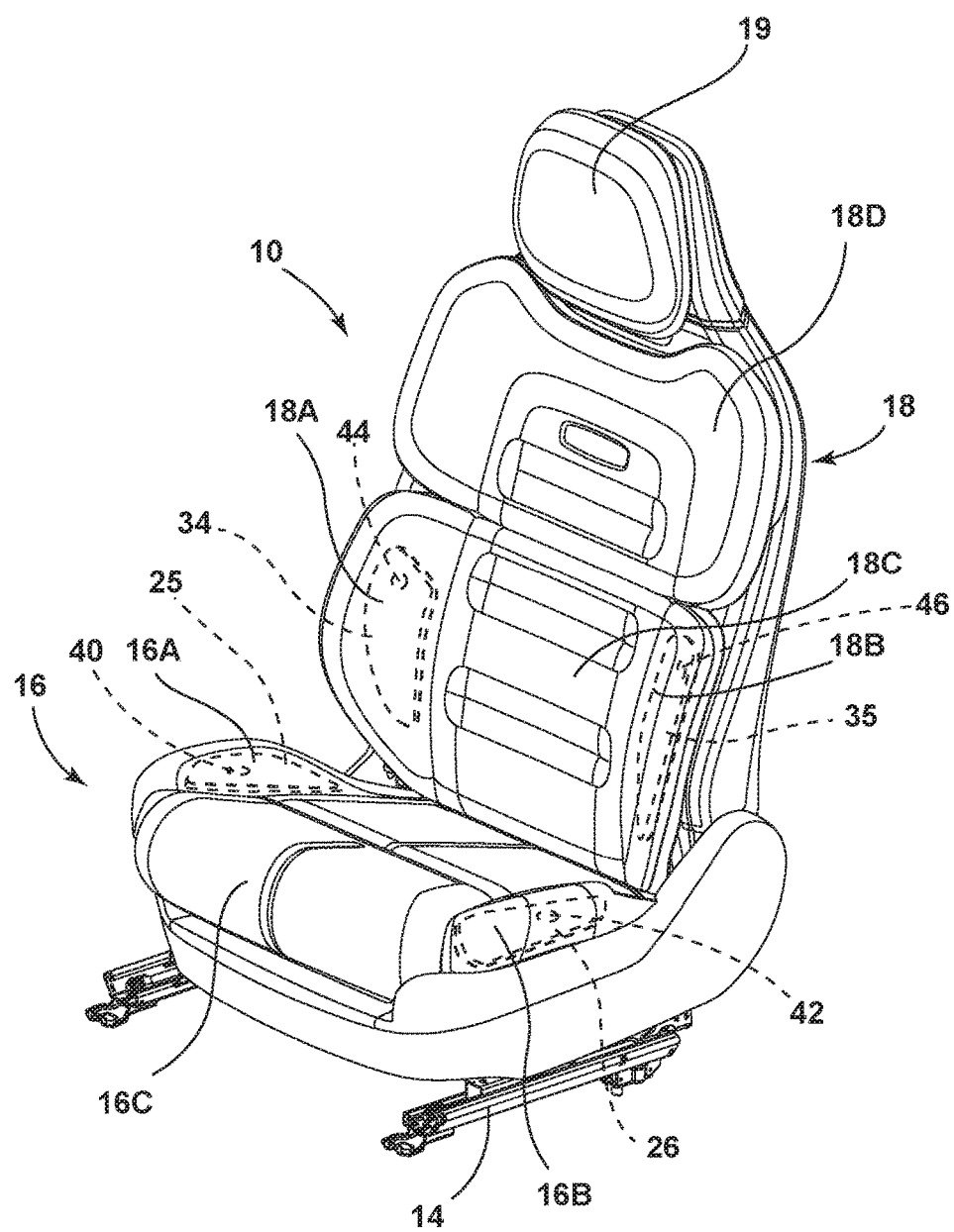
FIG. 2 is a top perspective view of the vehicle seat assembly of FIG. 1 removed from the vehicle and showing a plurality of adjustable components disposed in various positions within the vehicle seat in phantom.

Referring now to FIG. 2, the vehicle seat 10 is shown removed from the vehicle interior 12A (FIG. 1). As shown in phantom in FIG. 2, adjustable components 25, 26 are shown disposed in side bolsters 16A, 16B, respectively, of the seat portion 16, and adjustable components 34, 35 are shown disposed in side bolsters 18A, 18B, respectively, of the seatback 18. The adjustable components 25, 26, 34, and 35 are configured to adjust between extended and retracted positions in response to a sensor input, as further described below.

In the vehicle seat 10 of FIG. 2, the adjustable components 25, 26, 34, and 35 are shown in phantom in the retracted or stowed position, such that the adjustable components 25, 26, 34 and 35, as found in FIG. 2, do not augment the support of the side bolsters 16A, 16B, 18A, 18B of the seat portion 16 and the seatback 18. As further shown in FIG. 2, sensors 40, 42, 44, and 46 are associated with adjustable components 25, 26, 34, and 35, respectively. The sensors 40, 42, 44, and 46 are contemplated to be pressure sensors, such as piezoresistive sensors, which may be integrated into the seat cover 20. The sensors 40, 42, 44, and 46 are able to recognize the position of a vehicle occupant seated in the vehicle seat 10 and measure the pressure that the vehicle occupant's body produces on the various portions of the vehicle seat 10. In the embodiment shown in FIG. 2, the sensors 40, 42, 44, and 46 are shown disposed directly on the adjustable components 25, 26, 34, and 35, however, it is contemplated that the sensors 40, 42, 44, and 46 can be positioned anywhere on the vehicle seat for measuring the position of the vehicle occupant's body. Further, it is contemplated that more than one sensor can be associated with each adjustable components 25, 26, 34, and 35.

The sensors 40, 42, 44, and 46 are contemplated to be thin sensors such that they may be stitched into a thin fabric structure which can be directly sewn to the seat cover 20. In use, the sensors 40, 42, 44, and 46 are interconnected with a controller of a data processing system. The controller, further described below, may include a plurality of controllers that multiplex inputs from the sensors 40, 42, 44, and 46, such that the controller can output to the data processing system. The data from the sensors 40, 42, 44, and 46 is processed through an algorithm by the data processing system that will detect movement of the vehicle occupant and the pressure the vehicle occupant's body creates on specific portions of the vehicle seat 10 based on changes in values in a large two-dimensional array of inputs from the sensors 40, 42, 44, and 46. Thus, as a vehicle occupant negotiates a corner, the pressure their body creates increases on one side of the vehicle seat 10, and the algorithm can detect that change and send a signal to the seat controller to adjust the adjustable components (such as adjustable components 25, 26, 34, 35) on the pressurized side of the vehicle seat 10 to increase support for the vehicle occupant on the side to which the vehicle occupant is leaning. When the cornering situation is completed, the sensors 40, 42, 44, and 46 are configured to sense the decrease in pressure and report the same to the controller. The controller will then return the adjustable components to their at-rest positions. In this way, the vehicle seat 10 of the present concept provides real-time or active support adjustment for a vehicle occupant.

Figure 3:
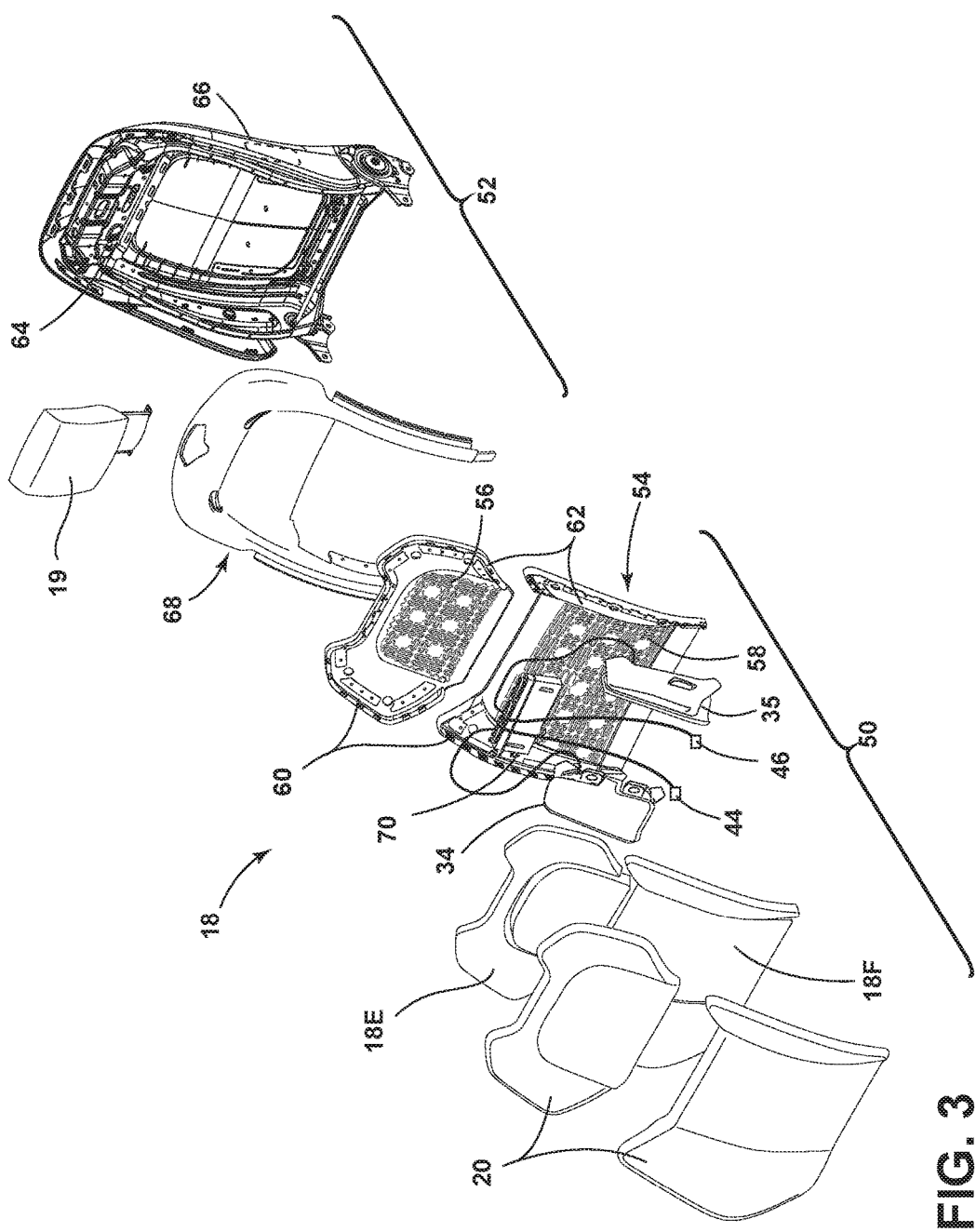
FIG. 3 is an exploded top perspective view of a seatback assembly of the vehicle seat of FIG. 2.

Referring now to FIG. 3, the seatback 18 includes a front support portion 50 which includes upper and lower support portions 18E, 18F of the seatback 18 that are covered by the seat cover 20. The upper and lower support portions 18E, 18F are contemplated to be comprised of cushion material, such as the cushion material CM shown in FIG. 1, and are contemplated to be attached to a support structure 52 with a suspension assembly 54. In the illustrated embodiment, the suspension assembly 54 includes upper and lower portions 56, 58, which each include forwardly and laterally extending support fins 60, 62. The upper and lower portions 56, 58 of the suspension assembly 54 generally define the structure of the side bolsters 18A, 18B of the seatback 18. The suspension assembly 54 is contemplated to be a polymeric part that generally defines a trim carrier for the seatback 18. The support structure 52 includes a seatback frame 64 having a rear panel 66 coupled thereto, and a front panel 68 shown exploded away therefrom. In the embodiment shown in FIG. 3, the adjustable components 34, 35 are shown associated with the lower support fins 60, 62 of the front support portion 50. It is contemplated that additional adjustable components may be associated with the upper support fins 60, 62 of the front support portion 50. In the embodiment shown in FIG. 3, it is suggested that the adjustable components 34, 35 be supported from the polymeric portion of the suspension assembly 54 at the support fins 60, 62 thereof. In this arrangement, the adjustable components 34, 35 would be covered by the cushion material of the upper and lower support portions 18E, 18F of the seatback 18. It is also contemplated that the adjustable components 34, 35 can be supported on the cushion material of the upper and lower support portions 18E, 18F to then be covered by the seat cover 20. As such, the placement of the adjustable components 34, 35 in FIG. 3 is contemplated to be one of many different placements that will provide for active adjustable support for a vehicle occupant in countering acceleration forces realized on the vehicle occupant.

As further shown in FIG. 3, sensors 44 and 46 are shown positioned adjacent to the adjustable components 34, 35, however, it is contemplated that the position of the sensors 44, 46 may be anywhere within the seatback 18 to properly measure pressure forces applied by a vehicle occupant in determining a position of the vehicle occupant. Specifically, the sensors 44, 46 may be stitched to the seat cover 20, such that the sensors 44, 46 are disposed directly adjacent to a vehicle occupant in use. The seat cover 20 may conceivably include a fabric material, a leather material, a vinyl material, or other upholstery materials (and combinations thereof) generally known in the art. As further shown in FIG. 3, the sensors 44, 46 and the adjustable components 34, 35 are operably coupled to a controller 70 via leads. As explained above, the controller 70 is contemplated to control movement of the adjustable components 34, 35 between stowed and deployed positions based on data received from the sensors 44, 46, and further described below.

Figure 4:
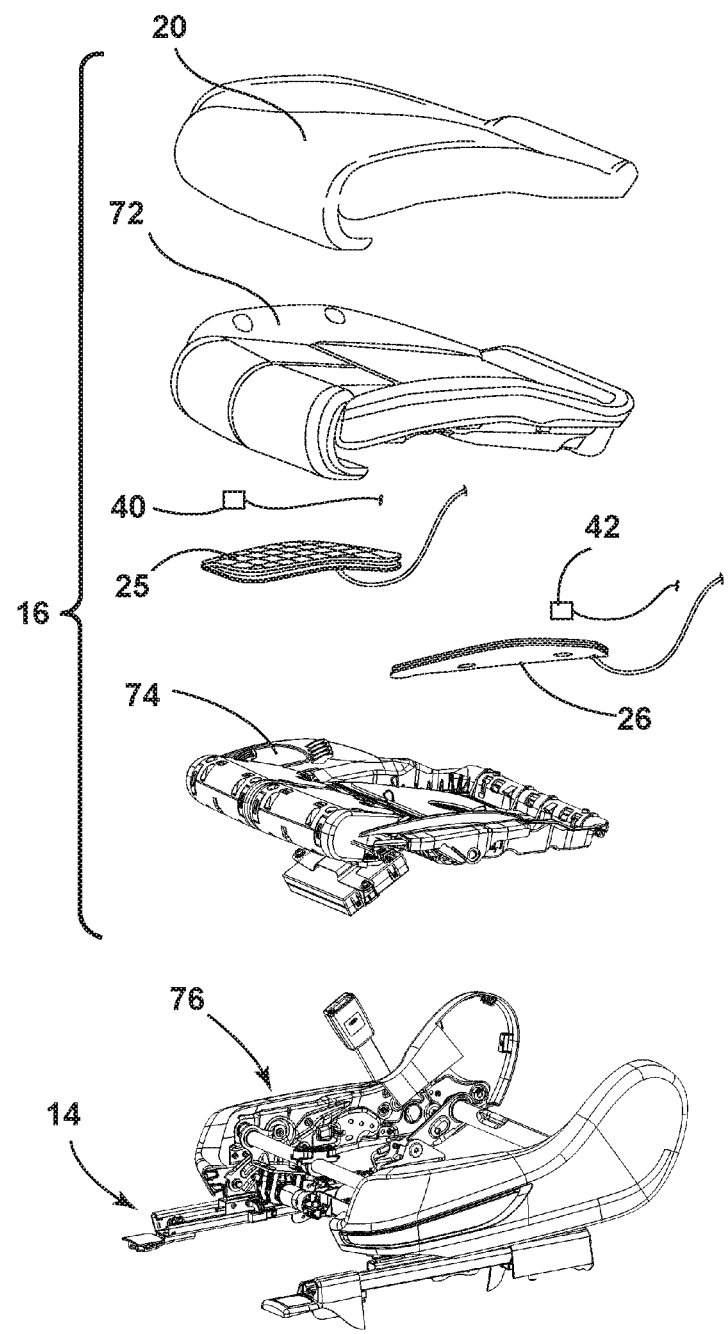
FIG. 4 is an exploded top perspective view of a seat portion of the vehicle seat of FIG. 2.

Referring now to FIG. 4, the seat portion 16 is shown having a cushioned support material 72 which is contemplated to be covered by the seat cover 20. The cushioned support material 72 is supported from a seat carrier 74 which is further supported from a frame assembly 76. The frame assembly 76 is contemplated to include a rigid structure having several support features comprised of metal. The frame assembly 76 is further configured to slideably couple to the track system 14. The seat carrier 74 may include a polymeric structure that is generally provided to support the cushioned support material 72. In the embodiment shown in FIG. 4, adjustable components 25, 26 are shown positioned between the seat carrier 74 and the cushioned support material 72. However, it is contemplated that the adjustable components 25, 26 may be supported on the cushioned support material 72 for adjustment directly below the seat cover 20. Sensors 40 and 42 are shown associated with the adjustable components 25, 26 and, as noted above, may be directly sewn into the seat cover 20 or any other portion of the seat portion 16 for accurately detecting a position of a vehicle occupant seated on the seat portion 16.

Figure 5:
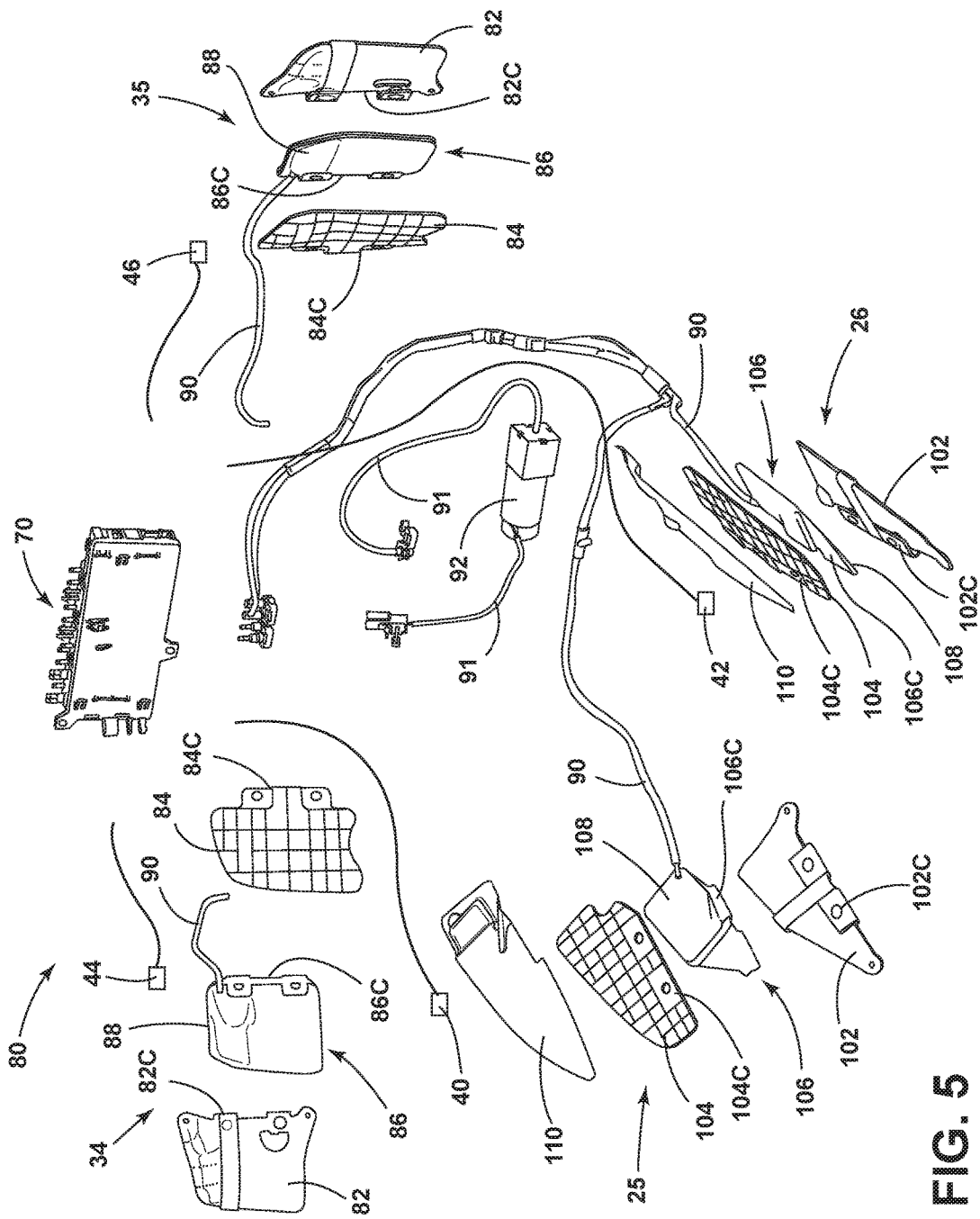
FIG. 5 is an exploded top perspective view of a vehicle seat adjustment system.

Referring now to FIG. 5, a vehicle seat adjustment system 80 is shown in an exploded condition. Specifically, the adjustable components 34, 35 of the seatback 18 and the adjustable components 25, 26 of the seat portion 16 of the vehicle seat 10 (FIG. 2) are shown in an exploded condition. The adjustable components 34, 35 of the seatback 18 each include a baseplate 82 and an articulating support plate 84. In assembly, the baseplate 82 and the articulating support plate 84 are coupled to one another in a hinged manner, such that the articulating support plate 84 can articulate or pivot with respect to the baseplate 82 between extended and retracted positions. The positions of the articulating support plate 84 may also be referred to as stowed and deployed positions or at-rest and support positions throughout this disclosure. The adjustable components 34, 35 further include an adjustment mechanism 86 which is configured to be disposed between the baseplate 82 and the articulating support plate 84 in assembly. The baseplate 82 includes a coupling side 82C, while the articulating support plate 84 also includes a coupling side 84C. Similarly, the adjustment mechanism 86 includes a coupling side 86C. In assembly, the baseplate 82, the articulating support plate 84, and the adjustment mechanism 86 are coupled to one another at the coupling sides 82C, 84C, and 86C, respectively, thereof, to provide for a hinged clam-shell configuration. The adjustment mechanism 86 is contemplated to be an air bladder 88 which is operable between inflated and deflated conditions. Other adjustment mechanisms known in the art may also be used for moving the articulating support plate 84 between the stowed and retracted positions. With the adjustment mechanisms 86 shown in the form of air bladders 88, supply lines 90, 91 are configured to couple to a pneumatic pump 92 and further couple to the controller 70 to supply air to the air bladders 88 and inflate the air bladders 88. The pneumatic pump 92 is configured to be coupled to the controller 70, such that the controller 70 can control the inflation and deflation of the air bladders 88 in response to input data from the sensors 44, 46.

With further reference to FIG. 5, the adjustable components 25, 26 of the seat portion 16 (FIG. 2) and are also shown in exploded conditions. The adjustable components 25, 26 of the seat portion 16 each include a baseplate 102 and an articulating support plate 104. In assembly, the baseplate 102 and the articulating support plate 104 are coupled to one another in a hinged manner, such that the articulating support plate 104 can articulate or pivot with respect to the baseplate 102 between extended and retracted positions in a clam-shell like manner. Much like adjustable components 34, 35, the adjustable components 25, 26 of the seat portion 16 further include an adjustment mechanism 106 which is configured to be disposed between the baseplate 102 and the articulating support plate 104 in assembly. The baseplate 102 includes a coupling side 102C, while the articulating support plate 104 also includes a coupling side 104C. Similarly, the adjustment mechanism 106 includes a coupling side 106C. In assembly, the baseplate 102, the articulating support plate 104, and the adjustment mechanism 106 are coupled to one another at the coupling sides 102C, 104C, and 106C, respectively, thereof. The adjustment mechanism 106 is contemplated to be an air bladder 108 which is operable between inflated and deflated conditions. Supply lines 90 may be coupled to the pneumatic pump 92 to inflate the air bladders 108 as controlled by the controller 70. The adjustable components 25, 26 further include cloth covers 110 which are applied to the articulating support plate 104 at an upper surface thereof to provide a soft outer portion of the adjustable components 25, 26 for contacting a vehicle occupant when the articulating support plates 104 are in the extended positions. Similar covers are also contemplated for use on the adjustable components 34, 36 of the seatback 18.

Figure 6:
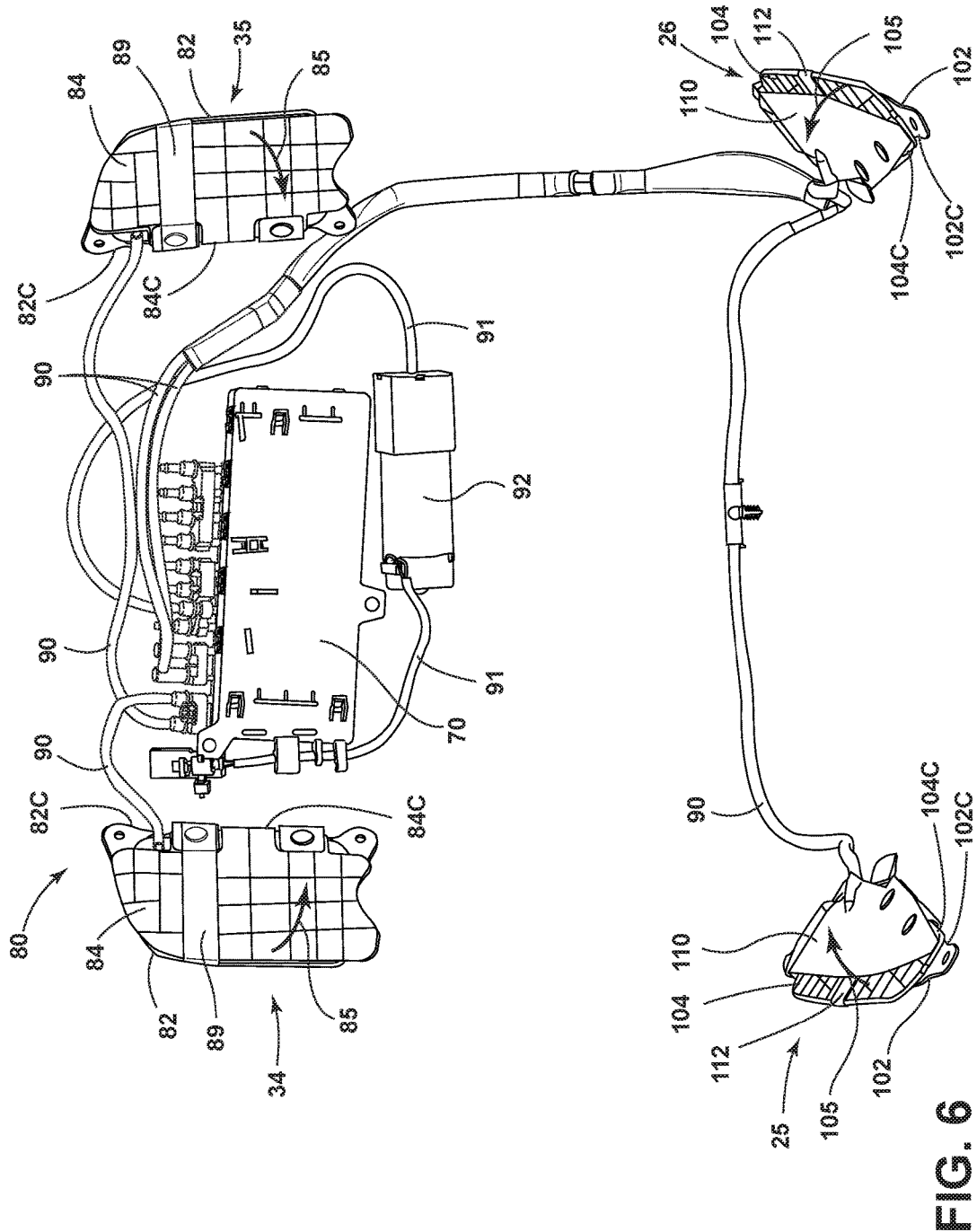
FIG. 6 is a front perspective view of the vehicle seat adjustment system of FIG. 5 in an assembled condition.

Referring now to FIG. 6, the vehicle seat adjustment system 80 is shown in an assembled condition. Specifically, the adjustable components 34, 35 of the seatback 18 and the adjustable components 25, 26 of the seat portion 16 of the vehicle seat 10 (FIG. 2) are shown in an assembled condition. The adjustable components 34, 35 of the seatback 18 (FIG. 2) and the adjustable components 25, 26 of the seat portion 16 (FIG. 2) are positioned in upper and lower positions, respectively, to illustrate the assumed positions of the adjustable components 25, 26, 34, 35 in the seat portion 16 and seatback 18, as shown in phantom in FIG. 2. As noted above, the baseplates 82 and 102 are hingedly coupled to the articulating support plates 84 and 104, respectively, such that the articulating support plates 84, 104 define articulating members which pivot inwardly (towards the central support portions 16C, 18C, respectively) with respect to the baseplates 82,102 between the extended and retracted positions. The articulating or pivoting movements of the articulating support plates 84, 104 are indicated in FIG. 6 at arrows 85 and 105, respectively. Thus, when the articulating support plates 84, 104 move from the stowed or retracted positions to the extended or deployed positions, the articulating support plates 84, 104 rotate inwardly towards the vehicle occupant to bolster support for the vehicle occupant and center the vehicle occupant.

Unlike other active vehicle seat adjustment systems, the vehicle seat adjustment system 80 of the present concept provides for selective and independent adjustment of multiple adjustable components 25, 26, 34, 35 on an as-needed basis. The as-needed basis relates to the activation of the adjustable components 25, 26, 34, 35 in an independent manner based upon pressure forces detected by the associated sensors 40, 42, 44, 46 of the adjustable components 25, 26, 34, 35. In this way, the vehicle seat adjustment system 80 of the present concept provides for active support bolstering when a vehicle occupant actually shifts position within the vehicle seat 10 (FIG. 2), rather than automatically responding to a particular vehicle condition (i.e. lateral acceleration forces (g-force), acceleration, velocity of the vehicle, steering degree). The vehicle conditions noted above may cause other active vehicle seat adjustment systems to bolster support when a vehicle occupant has and actually change position within the vehicle seat. In the present concept, the adjustable components 25, 26, 34, 35 move to the extended or deployed position only when pressure is sensed by the associated sensors 40, 42, 44, 46 due to a vehicle occupant actually moving within the vehicle seat 10 to apply the pressure sensed by the associated sensors 40, 42, 44, 46. The inward rotational movement indicated by arrows 85, 105 of the articulating support plates 84, 104 is a substantially opposite movement relative to the direction of a pressure force sensed by the sensors 40, 42, 44, 46, as further described below with reference to FIGS. 9A and 9B.

Figure 7A:
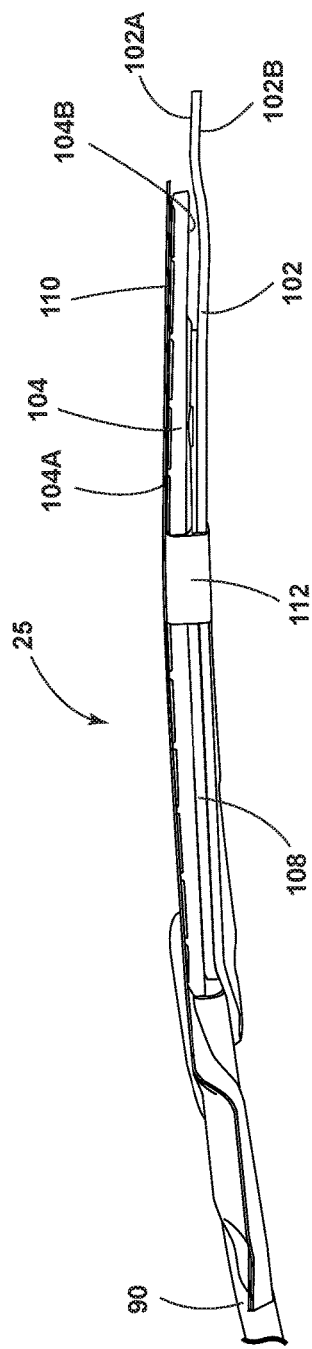
FIG. 7A is a side elevational view of an adjustable component in a retracted position.

Referring now to FIG. 7A, the adjustable component 25 of the seat portion 16 (FIG. 2) is shown in a retracted or stowed position. The operation of the adjustable component 25 is mirrored by the operation of the adjustable component 26 (FIG. 6), such that the following description of the operation of adjustable component 25 also relates inversely to the operation of adjustable component 26. As shown in FIG. 7A, the articulating support plate 104 includes an upper surface 104A and an undersurface 104B. The cloth cover 110 is shown disposed on the upper surface 104A of the articulating support plate 104. The baseplate 102 also includes an upper surface 102A and an undersurface 102B. The air bladder 108 is shown in the deflated condition and positioned between the articulating support plate 104 and the baseplate 102. Thus, the air bladder 108 abuts the upper surface 102A of the baseplate 102 and further abuts the undersurface 104B of the articulating support plate 104 as positioned therebetween. As further shown in FIG. 7A, a band 112 is shown coupled around the adjustable component 25, such that the band 112 wraps around both the baseplate 102 and articulating support plate 104 with the air bladder 108 disposed therebetween. The band 112 is contemplated to be a flexible and resilient member which biases the articulating support plate 104 to the stowed position shown in FIG. 7A. Thus, the band 112, as shown in FIG. 7A, is contemplated to be in an at-rest position.

Figure 7B:
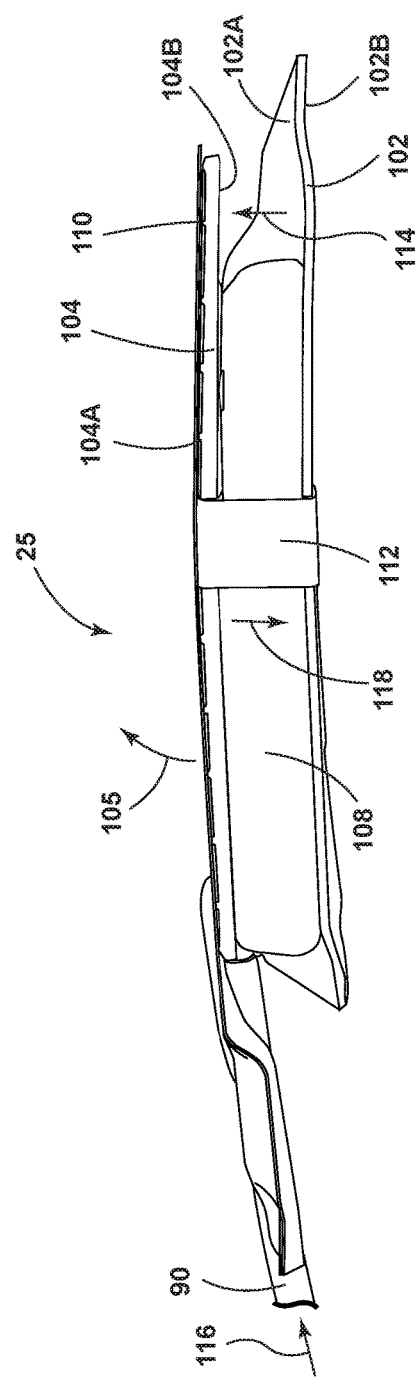
FIG. 7B is a side elevational view of the adjustable component of FIG. 7A in an extended position.

Referring now to FIG. 7B, the adjustable component 25 of the seat portion 16 (FIG. 2) is shown in the deployed or extended position due to the air bladder 108 being inflated to the inflated condition from the deflated condition (FIG. 7B). As the air bladder 108 abuts the undersurface 104B of the articulating support plate 104, the air bladder 108 moves the articulating support plate 104 to the extended or deployed position in the direction as indicated by arrow 105 as the air bladder 108 inflates and moves in the direction as indicated by arrow 114. As further shown in FIG. 7B, incoming air 116 is fed through supply line 90 to the air bladder 108 from the pump 92 (FIGS. 5 and 6) as controlled by the controller 70 (FIGS. 5 and 6). Thus, in FIG. 7B, it is contemplated that the controller 70 has detected a pressure value from the sensor 40 (FIG. 5) associated with adjustable component 25 to activate the pump 92 to fill the air bladder 108 to pivotally move the articulating support plate 104 to the extended position relative to the baseplate 102. In FIG. 7B, the band 112 is shown in a flexed position as opposed to the at-rest position shown in FIG. 7A. In this way, the band 112 is loaded and prepared to move the articulating support plate 104 towards the stowed position in the direction as indicated by arrow 118 when the controller 70 activates the signal to deflate the air bladder 108. It is contemplated that the air bladder 108 can deflate by a valve disposed on the air bladder that is electronically controlled, or through the supply line 90.

Referring now to FIG. 8A, the adjustable component 34 of the seatback 18 (FIG. 2) is shown in a retracted or stowed position. The operation of the adjustable component 34 is mirrored by the operation of the adjustable component 35 (FIG. 6), such that the following description of the operation of adjustable component 34 also relates inversely to the operation of adjustable component 35. As shown in FIG. 8A, the articulating support plate 84 includes an upper surface 84A and an undersurface 84B. The baseplate 82 also includes an upper surface 82A and an undersurface 82B. The air bladder 88 is shown in the deflated condition and positioned between the articulating support plate 84 and the baseplate 82. Thus, the air bladder 88 abuts the upper surface 82A of the baseplate 82 and further abuts the undersurface 84B of the articulating support plate 84 as positioned therebetween. As further shown in FIG. 8A, a band 89 is shown coupled around the adjustable component 34, such that the band 89 wraps around both the baseplate 82 and articulating support plate 84 with the air bladder 88 disposed therebetween. The band 89, much like band 112, is contemplated to be a flexible and resilient member which biases the articulating support plate 84 to the stowed position shown in FIG. 8A. Thus, the band 89, as shown in FIG. 8A, is contemplated to be in an at-rest position.

Referring now to FIG. 8B, the adjustable component 34 of the seatback 18 (FIG. 2) is shown in the deployed or extended position due to the air bladder 88 being inflated to the inflated condition from the deflated condition (FIG. 8B). As the air bladder 88 abuts the undersurface 84B of the articulating support plate 84, the air bladder 88 moves the articulating support plate 84 to the extended or deployed position in the direction as indicated by arrow 85 as the air bladder 88 inflates and moves in the direction as indicated by arrow 120. As further shown in FIG. 8B, incoming air 116 is fed through supply line 90 to the air bladder 88 from the pump 92 (FIGS. 5 and 6) as controlled by the controller 70 (FIGS. 5 and 6). Thus, in FIG. 8B, it is contemplated that the controller 70 has detected a pressure value from the sensor 44 (FIG. 5) associated with adjustable component 34, such that the controller 70 has activated the pump 92 to fill the air bladder 88 to pivotally move the articulating support plate 84 to the extended position from the retracted position (FIG. 8A). In FIG. 8B, the band 89 is shown in a flexed position as opposed to the at-rest position shown in FIG. 8A. In this way, the band 89 is loaded and prepared to move or bias the articulating support plate 84 towards the stowed position in the direction as indicated by arrow 122 when the controller 70 activates the signal to deflate the air bladder 88. Thus, the bands 89 and 112 (FIGS. 7A and 7B) define biasing mechanisms to bias the articulating support plates 84, 104 towards the retracted or stowed positions. It is contemplated that the air bladder 88 can deflate by a valve disposed on the air bladder that is electronically controlled, or through the supply line 90.

Figure 9A:
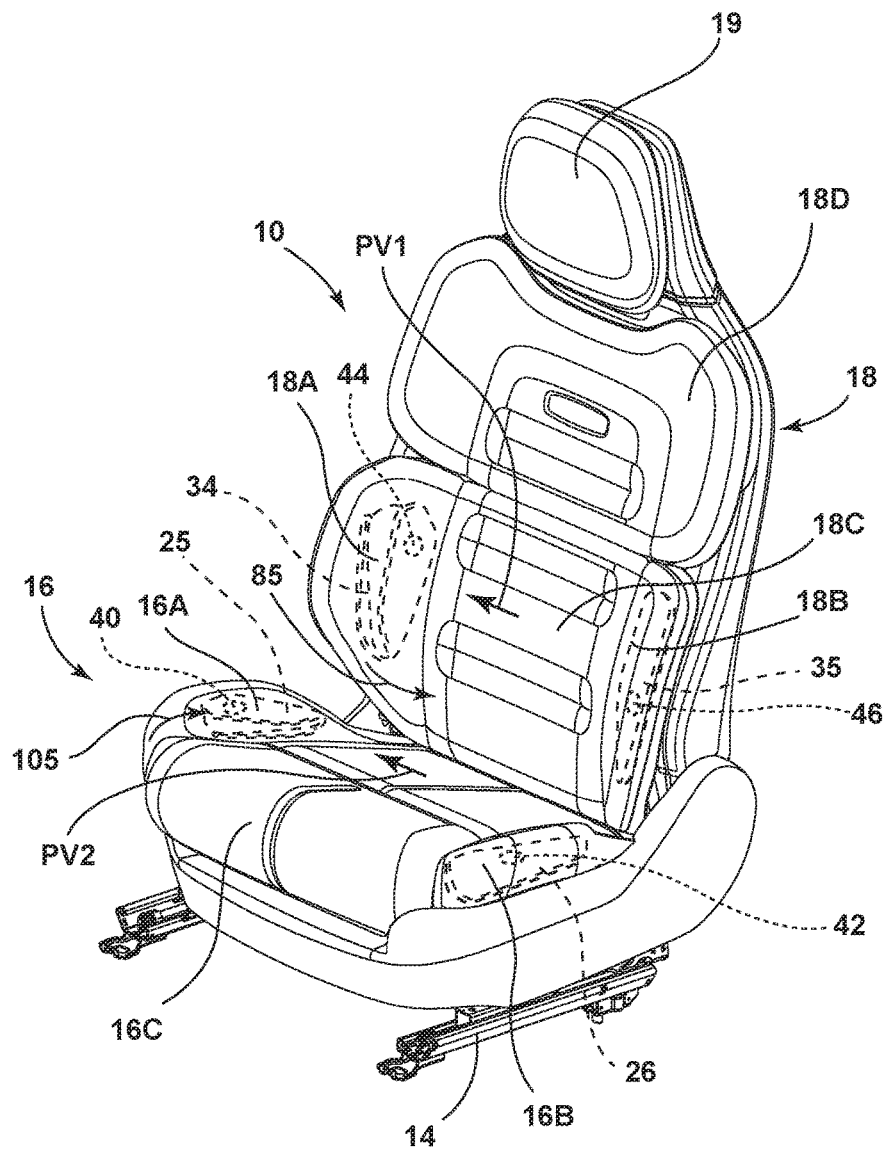
FIG. 9A is a top perspective view of a vehicle seat with adjustable components on a left side thereof disposed in extended positions and adjustable components on a right side thereof disposed in retracted positions.

Referring now to FIG. 9A, the vehicle seat 10 is shown with the adjustable components 25 and 34 in the extended or deployed positions. Thus, in one possible active adjustment scenario, it is contemplated that a vehicle occupant will have moved in the vehicle seat 10 to apply a dectable pressure to the pressure sensors 40, 44 associated with the adjustable components 25, 34, respectively. Thus, in such a scenario it is contemplated that the vehicle, within which the vehicle seat 10 is situated, may have made a left-hand turn, such that lateral acceleration forces moved a vehicle occupant towards the right-hand side of the vehicle seat 10 to apply pressure to pressure sensors 40, 44. Specifically, a first pressure value PV1 may have been applied to pressure sensor 44 in the direction as indicated by arrow PV1. The pressure value PV1 is shown in FIG. 9A to illustrate a lateral movement of a vehicle occupant towards the right within the vehicle seat 10. This pressure value (PV1) may be applied by a side of the torso or back of the vehicle occupant as the vehicle makes a left-hand turn. A second pressure value PV2 is shown in FIG. 9A to illustrate a lateral movement of a vehicle occupant towards the right within the vehicle seat 10. This pressure value (PV1) may be applied by a thigh or backside region of the vehicle occupant as the vehicle makes a left-hand turn. Thus, as the vehicle occupant shifts towards the right within the vehicle seat 10 towards the side bolsters 16A, 18A of the seat portion 16 and seatback 18, respectively, the pressure values PV1 and PV2 are detected by the sensors 44, 40. When the pressure values PV1, PV2 are detected by the sensors 44, 40, data from the sensors 44, 40 is sent to the controller 70 which then initiates an inflation sequence of the air bladders 108, 88 associated with the adjustable components 25, 34, respectively. As the air bladders 108, 88 inflate, the articulating support plates 84, 104 pivot inwardly in the directions as indicated by arrows 85 and 105, respectively, in a direction that is substantially opposed to the direction of the pressure values PV1, PV2, respectively. The opposed directional movement of the articulating support plates 84, 104 relative to the pressure values PV1, PV2 provides for active support adjustment for the vehicle occupant to counter the lateral acceleration forces realized on the vehicle occupant. While both the adjustable components 25 and 34 are shown in the extended or deployed positions in FIG. 9A, it is contemplated that the adjustable components 25, 34 can act both independently or in concert in response to one or more pressure values being sensed by the sensors 40, 42, 44, 46. In this way, one or both of the adjustable components 25, 34 can be activated with respect to a specific pressure map being applied by the vehicle occupant and sensed by the associated sensors 40, 44 within the seat portion 16 or the seatback 18 of the vehicle seat 10.

Figure 9B:
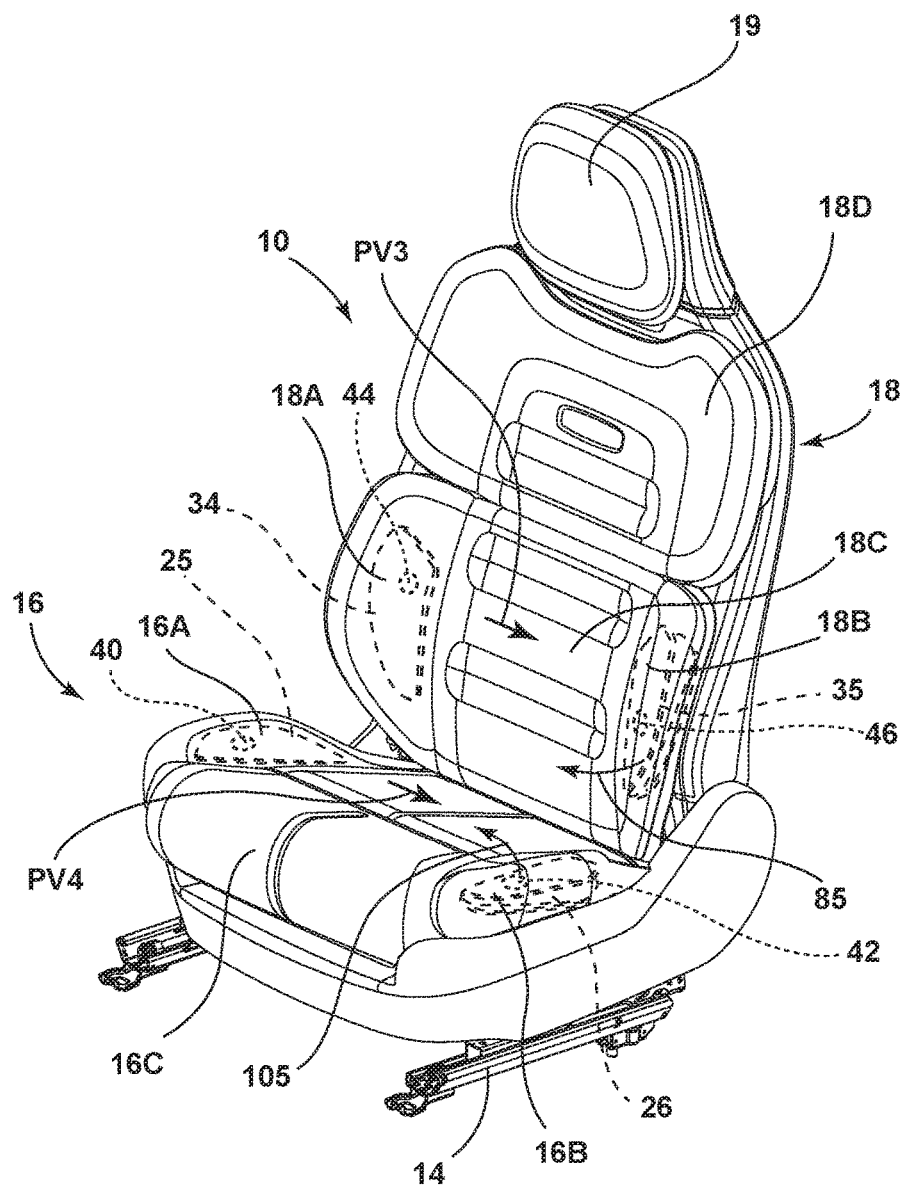
FIG. 9B is a top perspective view of the vehicle seat of FIG. 9A with adjustable components on the right side thereof disposed in extended positions, and adjustable components on the left side thereof disposed in retracted positions.

Referring now to FIG. 9B, the vehicle seat 10 is shown with the adjustable components 26 and 35 in the extended or deployed positions. Thus, it is contemplated that a vehicle occupant will have moved in the vehicle seat 10 to apply a pressure to the pressure sensors 42, 46 associated with the adjustable components 26, 35, respectively. Thus, it is contemplated that the vehicle, such as vehicle 12 shown in FIG. 1, may have made a right-hand turn, such that lateral acceleration forces moved a vehicle occupant towards the left-hand side of the vehicle seat 10 to apply pressure to pressure sensors 42, 46. Specifically, a third pressure value PV3 may have been applied to pressure sensor 46 in the direction as indicated by arrow PV3. The pressure value PV3 is shown in FIG. 9B to illustrate a lateral movement of a vehicle occupant towards the left within the vehicle seat 10. This pressure value (PV3) may be applied by a side of the torso or back of the vehicle occupant as the vehicle makes a right-hand turn. A fourth pressure value PV4 is shown in FIG. 9B to illustrate a lateral movement of a vehicle occupant towards the left within the vehicle seat 10. This pressure value (PV4) may be applied by a thigh or backside region of the vehicle occupant as the vehicle makes a right-hand turn. Thus, as the vehicle occupant shifts towards the left within the vehicle seat 10 towards the side bolsters 16B, 18B of the seat portion 16 and seatback 18, respectively, the pressure values PV3 and PV4 are detected by the sensors 42, 46. When the pressure values PV3, PV4 are detected by the sensors 42, 46, data from the sensors 42, 46 is sent to the controller 70 which then initiates an inflation sequence of the air bladders 108, 88 associated with the adjustable components 26, 35, respectively. As the air bladders 108, 88 inflate, the articulating support plates 84, 104 pivot inwardly in the directions as indicated by arrows 85 and 105, respectively. The pivoting directions of the articulating support plates 84, 104 indicated by arrows 85, 105, respectively, are substantially opposed to the directions in which the pressure values PV3, PV4, respectively, are aligned and applied by a vehicle occupant. In this way, the pivoting directions of the articulating support plates 84, 104 serve to re-center a vehicle occupant after the vehicle occupant has shifted position. Further, this centering affect is localized in the present system to areas only where the pressure is directly applied by the vehicle occupant and sensed by the sensor. No other vehicle parameter initiates the moving of the articulating support plates 84, 104, such that unnecessary movement of the support plates is eliminated when the vehicle occupant has not actually moved in the vehicle seat. The opposed directional movement of the articulating support plates 84, 104 relative to the pressure values PV3, PV4 provides for active support adjustment for the vehicle occupant to counter the lateral acceleration forces realized on the vehicle occupant. While both the adjustable components 26 and 35 are shown in the extended or deployed positions in FIG. 9B, it is contemplated that the adjustable components 26, 35 can act independently in response to an isolated pressure value being sensed. In this way, one or both of the adjustable components 26, 35 can be activated with respect to a specific pressure being applied by the vehicle occupant and sensed by the associated sensors 42, 46 within the seat portion 16 or the seatback 18 of the vehicle seat 10.

As noted above, and shown in FIGS. 5 and 6, the controller 70 is operably coupled to the adjustment mechanisms 86, 106 or air bladders 88, 108. The sensors 40, 42, 44, 46 are configured to sense a pressure value applied in a first direction, such as the directions indicated in FIGS. 9A and 9B by arrows PV1-PV4. The controller 70 activates the mechanisms 86, 106 or (air bladders 88, 108) to move the articulating support plates 84, 104 towards the extended positions when the pressure value sensed by the sensors 40, 42, 44, 46 exceeds a predetermined value. Thus, the sensors 40, 42, 44, 46 are operably coupled to the controller 70 and configured to sense a force or pressure directly applied by the vehicle occupant. The sensors 40, 42, 44, 46 are further configured to generate an output signal to the controller 70. The controller 70 can determine if the force or pressure value sensed by the sensors 40, 42, 44, 46 exceeds the predetermined threshold value. If the force or pressure value sensed by the sensors 40, 42, 44, 46 exceeds the predetermined threshold value, the controller 70 can activate the pump 92 to move the articulating support plates 84, 104 towards the extended positions to bolster support for the vehicle occupant. Further, the controller 70 can determine if the pressure value sensed by a sensor falls below the threshold value or is no longer detected at all. In such a case, the controller 70 can activate an associated adjustment mechanism 88, 108 to move the articulating support plate 84, 104 back to the at-rest or stowed/retracted position.

Further, it is contemplated that the controller 70 adjusts the articulating support plates 84, 104 to a degree of extension that is calculated as a function of the pressure value detected by the sensors 40, 42, 44, 46. Thus, the articulating support plates 84, 104 pivot in a second direction that is substantially opposed to the direction in which the pressure value is applied as described above with regards to FIGS. 9A and 9B. The degree of extension of the articulating support plates 84, 104 is directly related to the pressure value sensed by the sensors 40, 42, 44, 46 and sent to the controller 70. Thus, the relationship between the degree of extension and the pressure value sensed by the sensors 40, 42, 44, 46 can be calculated in such manner so as to be represented by FIG. 10, wherein A=the pressure value applied by the vehicle occupant and sensed by the sensors 40, 42, 44, 46 and B=the degree of extension of the articulating support plates 84, 104. Further, B can also represent the degree of inflation of the air bladders 88, 108.

Figure 10:
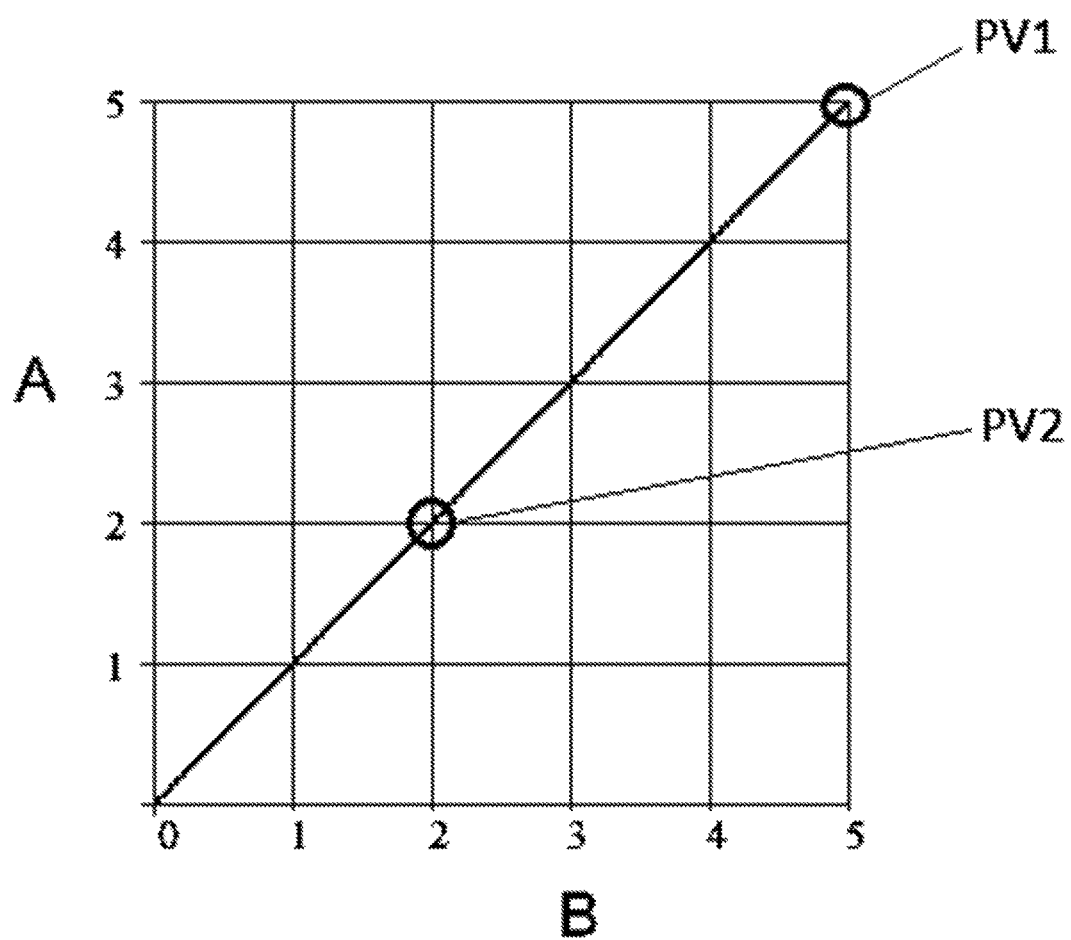
FIG. 10 is a graphical representation of sensed pressure values and corresponding degrees of movement of associated support plates.

As further shown in FIG. 10, pressure values PV1 and PV2 are plotted on the chart of FIG. 10, wherein pressure value PV1 has a value of 5 as compared to the value of 2 associated with pressure value PV2. It is contemplated that the pressure value sensed by the sensors 40, 42, 44, 46 may be recorded in Pascals ($N/m^2$) or pounds per square inch (psi), but other common units of pressure may be used (such as atmospheres (atm), technical atmospheres (at), bars, inches of mercury (in. Hg), millimeters of mercury (mm Hg), and torr. As noted above, the present concept is configured to provide movement of a support plate of an adjustable component to a degree commensurate with a pressure value detected by an associated sensor. Thus, with the pressure values PV1 and PV2 plotted on the chart of FIG. 10, and associated support plate of an adjustable component is configured to move to a degree of 5 in response to pressure value PV1, and to a degree of 2 in response to pressure value PV2. Thus, the degree of movement or rotation of the support plate is calculated as a function of the pressure value detected by a sensor. The degree of movement of a support plate of an adjustable component may be calculated in length (as in the amount which a support plate pivots along the path as indicated by arrows 85 and 105 (degree of rotation), inflation level (as in the degree to which an air bladder 88, 108 is inflated), or a degree of inward extension from the at rest position of the support plate. As noted above, the movement of the support plate of an adjustable component is substantially opposed to the direction in which the pressure value is applied.

As further shown in FIGS. 9A and 9B, the sensors 40, 42, 44, 46 are positioned near the adjustable components 25, 26, 34, 35, such that movement of the adjustable components 25, 26, 34, 35 is actively conducted in response to a localized pressure value realized on or near the adjustable components 25, 26, 34, 35. In this way, the present concept provides direct support for a vehicle occupant precisely where that support is needed.

While the description of the active bolstering system provides for movement of the adjustable components 25, 26, 34, 35 in response to a localized pressure value detected by the associated sensors 40, 42, 44, 46, it is further contemplated that the same bolstering system can adjust the adjustable components 25, 26, 34, 35 when a pressure is not detected by the sensors 40, 42, 44, 46. In this way, the system can provide a cradling effect when a vehicle occupant is initially seated in the vehicle seat 10 (FIG. 1). For instance, when a vehicle occupant is seated in the vehicle seat 10, one or more of the sensors 40, 42, 44, 46 may not register a pressure reading. As such, the controller 70 can be programmed to adjust the position of the adjustable components 25, 26, 34, 35 until a pressure reading is detected by the associated sensors 40, 42, 44, 46. Thus, the adjustable components 25, 26, 34, 35 can rotate inwardly to contact the vehicle occupant as seated in the vehicle seat 10 to provide a cradling feature to the vehicle occupant from the vehicle seat 10. In this way the support system can provide a tailored configuration for a specific vehicle occupant. Inward adjustment of the adjustable components 25, 26, 34, 35 can terminate when a pressure value (above 0) is sensed, or when a threshold pressure value is detected. Such a cradling feature is may be suitable for high performance vehicles where bolstered support and custom cradling is desired to properly situate a vehicle occupant within a vehicle having augmented performance handling.

The present concept further includes a method for actively adjusting an adjustable component in a vehicle seat using the components described herein. In one embodiment, the method includes the steps of providing a seat assembly 10 (FIG. 1) having a seat portion 16 with first and second side bolsters 16A, 16B disposed on opposite sides of the seat portion 16. The seat assembly 10 further includes first and second adjustable components 25, 26 (FIG. 2) and first and second sensors 40, 42 disposed in the first and second side bolsters 16A, 16B, and a controller 70 (FIG. 3) operably coupled to both the first and second adjustable components 25, 26 and the first and second sensors 40, 42. The method further includes the step of detecting a pressure value using one of the first and second sensors 40, 42 and determining if the pressure value exceeds a predetermined threshold value. The predetermined threshold value can be pre-set by the manufacturer, or can be a programmable feature of the controller 70. The method further includes the step of moving an articulating support plate 110 (FIG. 7A) of the adjustable component (25 or 26) associated with the sensor (40 or 42) detecting the pressure value towards an extended position from a retracted position (FIGS. 7A and 7B) to a degree commensurate with pressure value detected. The method further includes the step of determining if the pressure value falls below the threshold value. If so, the method further includes the step of moving the articulating support plate 110 towards the retracted position when the pressure value is below the threshold value.

The method further includes inflating an air bladder 108 (FIG. 5) with a pump 92 controlled by the controller 70, wherein the air bladder 108 is positioned to abut an undersurface 104B (FIG. 7A) of the articulating support plate 110 to move the articulating support plate 110 towards the extended position (FIG. 7B) when the air bladder 108 is in an inflated condition. Deflating the air bladder 108 moves the support plate 110 towards the retracted position from the extended position.

In another embodiment, a method for actively adjusting an adjustable component, includes the step of providing a seat assembly 10 (FIG. 2) having a seat portion 16 with a side bolster 16A, an adjustable component 25 and an associated sensor 40 disposed in the side bolster 16A, and a controller 70 (FIG. 3) operably coupled to the adjustable component 25 and the sensor 40. In this method, a pressure value is detected with the sensor 40 and a support plate 110 of the adjustable component 25 moves towards an extended position from an at-rest position (FIGS. 7A and 7B). In this embodiment, the pressure value is associated with a pressure force aligned in a first direction, and the step of rotating the support plate of the adjustable component towards the extended position from the at-rest position further includes the step of rotating the support plate 110 of the adjustable component 25 in a second direction that is substantially opposed to the first direction of the pressure force. The method further includes moving the support plate 110 towards the retracted position when the pressure value is no longer detected by the sensor 40.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A method for adjusting adjustable components in a seat assembly, including the steps of:
   providing a seat assembly having a seat portion with first and second side bolsters disposed on opposite sides of the seat portion, first and second adjustable components and first and second sensors disposed in the first and second side bolsters, and a controller operably coupled to both the first and second adjustable components and the first and second sensors;
   supporting a seat occupant on the seat portion;
   moving respective first and second articulating support plates of the first and second adjustable components to move the first and second side bolsters into contact with the seat occupant;
   detecting respective first and second pressure values using the first and second sensors as the first and second side bolsters contact the seat occupant;
   stopping movement of the first and second articulating support plates of the first and second adjustable components; and
   retaining the first and second articulating support plates of the first and second adjustable components in deployed positions.

2. The method of claim 1, wherein the step of stopping movement of the first and second articulating support plates of the first and second adjustable components further includes:
   stopping movement of the first and second articulating support plates of the first and second adjustable components when the respective first and second pressure values are detected.

3. The method of claim 1, wherein the step of stopping movement of the first and second articulating support plates of the first and second adjustable components further includes:

stopping movement of the first and second articulating support plates of the first and second adjustable components when the respective first and second pressure values exceed a predetermined threshold pressure value.

4. The method of claim 1, wherein the method further includes:

moving the first and second articulating support plates of the first and second adjustable components towards retracted positions when the first and second pressure values are no longer detected.

5. The method of claim 1, wherein the step of moving respective first and second articulating support plates of the first and second adjustable components to move the first and second side bolsters into contact with the seat occupant further includes:

inflating first and second air bladders using one or more pumps controlled by the controller, wherein the first and second air bladders are positioned to abut undersurfaces of the first and second articulating support plates, respectively.

6. The method of claim 1, wherein the first and second adjustable components each include respective first and second baseplates hingedly coupled to the first and second articulating support plates, respectively.

7. The method of claim 6, including:

moving the first and second articulating support plates of the first and second adjustable components towards retracted positions using a biasing mechanism operably coupled between the first and second baseplates and the first and second articulating support plates, respectively, when the first and second pressure values are no longer detected.

8. A method of adjusting a seat assembly, including the steps of:

providing a seat assembly having an adjustable support plate, a bolster and a sensor;

supporting a seat occupant on the seat assembly;

moving the support plate by inflating an air bladder with a pump controlled by a controller, wherein the air bladder is positioned to abut an undersurface of the support plate to rotate the support plate towards a deployed position as the air bladder is brought to an inflated condition;

contacting the seat occupant with the bolster as adjusted by the support plate;

sensing a pressure value applied to the support plate using the sensor as the bolster contacts the seat occupant; and retaining the support plate in the deployed position.

9. The method of claim 8, including:

stopping movement of the support plate when the pressure value reaches a predetermined pressure threshold as detected by the sensor.

10. The method of claim 8, wherein the pressure value is associated with a pressure force aligned in a first direction, and further wherein the step of moving the support plate further includes:

rotating the support plate in a second direction that is substantially opposed to the first direction of the pressure force.

11. The method of claim 10, wherein the method further includes:

moving the support plate towards a retracted position from the deployed position when the pressure value is no longer detected.

12. The method of claim 11, wherein the step of moving the support plate towards the retracted position further includes:

deflating the air bladder to move the support plate towards the retracted position from the deployed position.

13. The method of claim 11, including:

a baseplate hingedly coupled to the support plate, and further wherein the step of moving the support plate towards the retracted position further includes, biasing the support plate towards the baseplate using a biasing member coupled between the baseplate and the support plate.

14. The method of claim 8, including:

stopping movement of the support plate when the pressure value is detected by the sensor.

* * * * *